Jan. 12, 1965 D. C. MUELLER 3,165,719
MATRIX OF COINCIDENCE GATES HAVING COLUMN AND ROW SELECTION
Filed Nov. 13, 1959
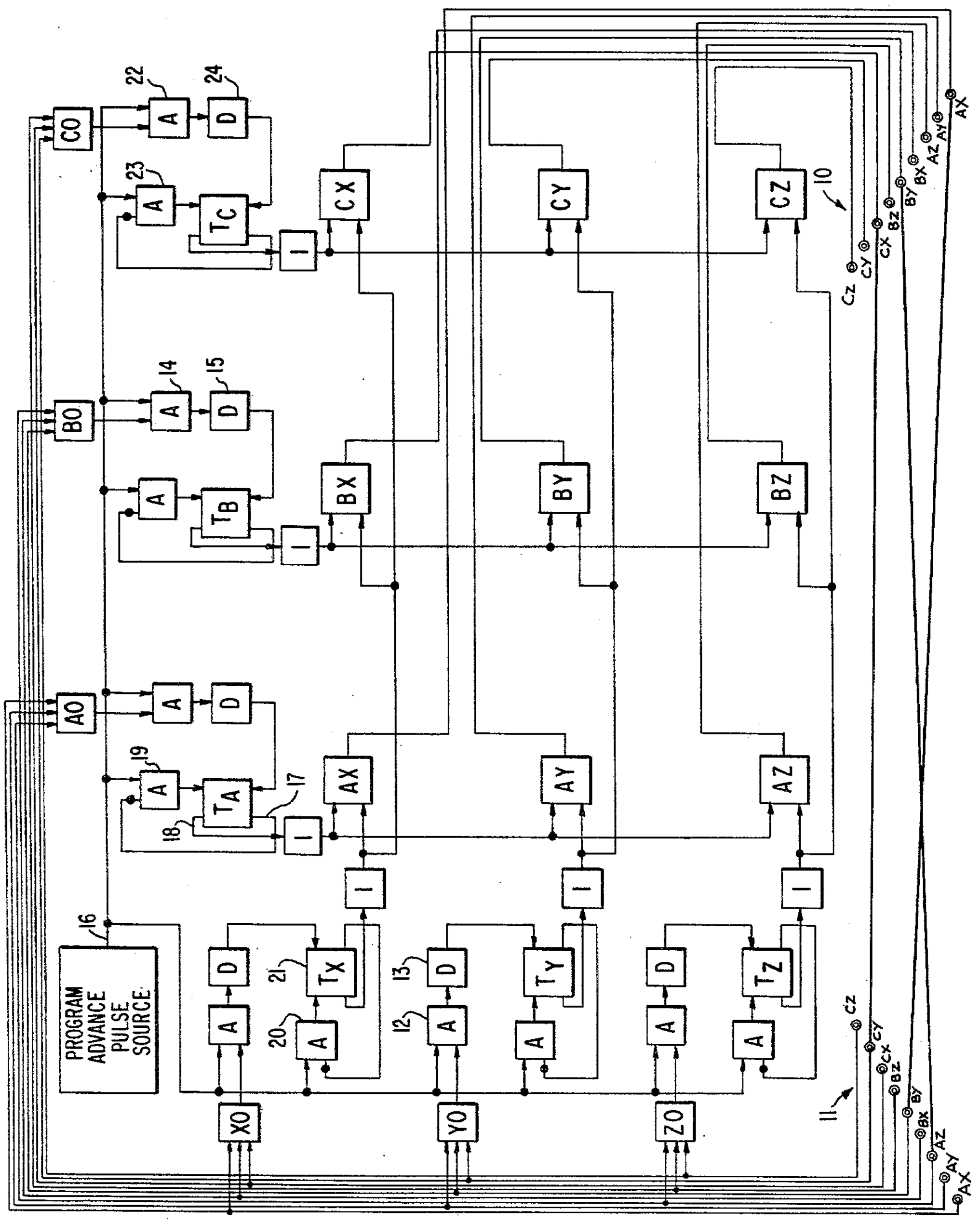
LEGEND
I _ INVERTER
$T_A$,etc_TRIGGERS
A _ AND GATE
AO,etc_OR GATES
D _ DELAY
AX,etc_AND GATES
INVENTOR.
D. C. MUELLER
BY
Seghue, Rothwell, Mion & Zinn
ATTORNEYS United States Patent Office 3,165,719
Patented Jan. 12, 1965

3,165,719
MATRIX OF COINCIDENCE GATES HAVING COLUMN AND ROW SELECTION

Dave C. Mueller, Stillwater, Okla., assignor to International Business Machines Corporation, New York, N.Y., a corporation of New York Filed Nov. 13, 1959, Ser. No. 852,744
1 Claim. (Cl. 340—166)

This invention relates to apparatus adapted to achieve either sequential or nonsequential matrix program step control and more particularly to a matrix for supplying program steps, said matrix being driven by two coordinate stepping rings.

If we consider the matrix of two-state devices which may, for instance, be coincident gates, it is quite common to address these gates by rings. For instance, if we assume a matrix 10 x 10 a first ring designated as the units ring is advanced each time a clock pulse is supplied thereto. This units ring provides the addressing for one coordinate of the matrix. The tens ring which is also a 10-stage ring and provides the other coordinate addressing for the matrix is stepped each time the first ring overflows. In such a system the addressing of the matrix elements is of course in sequence and, consequently, the programming that can be obtained from such a system is limited to sequential programming.

The present invention, on the other hand, includes a matrix which may be used for providing programming steps and this matrix is also addressed by two rings. However, means are provided in accordance with the present invention whereby the addressing and consequently the program steps available from the matrix need not be sequential but may be nonsequential at least in part. For instance, if we assume a 10 x 10 matrix in which the matrix elements are identified from 1 to 100, in accordance with the present invention, it is possible to provide programming steps from elements 1 sequentially through element 10 and then skip to element 15 and go to 100. It is also possible to proceed in a forward direction and then go back and then in a forward direction again. Any combination of these is possible with the present invention. Of course the present invention also can be used to provide straight sequential program steps.

It is therefore an object of this invention to provide a circuit which is versatile and reliable to produce various sequences of program steps.

The above and other objects will be apparent from a description of the accompanying drawing.

The single figure of the drawing is a diagrammatic illustration of a circuit constructed in accordance with this invention.

Referring to the drawing, there is shown a circuit comprising a matrix, which, in this case is illustrated as a 3 x 3 matrix, including coincident AND gates AX, AY . . . CZ. Two coordinate inputs to any one of the gates are derived from two bistable storage elements or triggers, for instance, for gate AX, the inputs are obtained from triggers TA and TX. The triggers are grouped into two groups; namely, a group of row triggers TA, TB and TC, and a group of column triggers TX, TY, and TZ. These triggers are conventional two-state devices having an on and an off condition. In the instant case a conventional Eccles-Jordan trigger can be employed. As shown at trigger TA two output leads, 17 and 18, extend from opposite sides of the trigger; when the voltage level on 17 is up, the voltage level on 18 is down. However, the lead 18 goes to an inverter I, which has an up output when the lead 18 is down. In the On condition of the trigger, the voltage on lead 17 is up and the output from inverter I is up. When the trigger is Off, both voltage levels are down. Thus, the lead 17 and the lead 18 and inverter I, are collectively referred to as "ON output terminal means."

Let us assume that triggers TA and TX are in the On condition and consequently gate AX is unblocked to provide an output therefrom. All of the other triggers are Off and consequently gate AX is the only one that provides an output, therefrom. The output which we will assume is an up level output, is applied to the program step exit terminal AX, which is one of the group of exit terminals, shown at numeral 10, which bear alphabetic designations identifying them with their corresponding gates. Opposite the exit terminals 10 is a group of program step entry terminals 11 bearing individual identifications AX, AY . . . CZ, which relate them, respectively, to the correspondingly lettered AND gates. Any program step exit terminal 10 can be connected by a plug wire 30, as shown, to any program step entry terminal 11, to provide any desired program step sequence. For example, exit terminal AX is connected to entry terminal BY, CX is connected to CY, etc. Each entry terminal is coupled, by circuitry to be described, to a corresponding pair of the previously mentioned bistable storage elements or triggers TA, TB—TZ, each said pair including a row trigger and a column trigger. For example, the entry terminal BY will be shown to be coupled to row trigger TB and to column trigger TY.

To continue with the example, the up level at exit terminal AX is transmitted by a plug wire 30 to program step entry terminal BY, thence to OR gate YO and OR gate BO. These are the OR gates respectively associated with trigger TY and trigger TB. OR gate YO provides an up level to coincident gate 12 associated with the On input of trigger TY through the delay 13 and OR gate BO provides an up level to coincident gate 14 associated with the On input of trigger TB through the delay unit 15. Consequently, gates 12 and 14 are conditioned by the outputs from OR gates YO and BO which in turn provide said conditioning outputs because of the external wiring connection between exit AX and entry BY. The program of course in accordance with this setup is to transfer from step AX to step BY. Now the next program advance pulse, from any convenient source, is admitted to line 16. Only two of the gates as we have said before, namely, gates 12 and 14, are conditioned and consequently these two gates are unblocked by this program advance pulse. However, we must consider the effect of the delays from units 13 and 15. We must also remember that trigger TA and trigger TX are at this time On. In the On condition trigger TA causes an up level output at output terminal 17 which is coupled to the input to coincident gate 19. The output of gate 19 is connected to the Off input to trigger TA. Also, the program advance line 16 connects to the other input to gate 19. Consequently, under the conditions observed here, gate 19 is conditioned because trigger TA and On and consequently the program advance pulse will unblock gate 19 and turn trigger TA Off. The same in this particular case is also true of trigger TX. Gate 20 is conditioned by the output 21 from trigger TX and the program advance pulse provides an output from gate 20 to the Off input of trigger TX to turn this trigger Off. The On channels to trigger TA and trigger TX are blocked because of the down levels at the outputs of OR gate AO and XO. Therefore, the program advance pulsing initially turns trigger TA Off and trigger TX Off. Then after a slight delay as introduced by the delay units 13 and 15, triggers TB and TY are turned On. It should be noted that the outputs of the delay units 13 and 15 are connected to the On inputs to their associated triggers. Now we have a situation where trigger TA is Off, trigger TX is Off, and triggers TB and TY are On. The outputs of triggers TB and TY through their associated inverters I provide an up level output now from the gate BY in the matrix.

As can be seen by the external wiring between the exits and entry, BY is coupled to AZ. Consequently, the up level from gate BY in the matrix is applied to OR gates ZO and AO. By the same process as gone through before, the next program step will turn triggers TB and TY Off and turn triggers TA and TZ On.

Thus far we have illustrated the case where both triggers of the previous step are turned Off and two triggers associated with the new program are turned On. However, in some cases only one of the triggers associated with the previous step is turned Off. The other remains On even for the new step. For instance, we have shown the external wiring to go from program step CX to CY. In this case as we shall see, with trigger TC and trigger TX On, OR gates CO and YO are conditioned for the next program step. The next program advance pulse then comes along and at first turns trigger TC Off and then turns it back On again. It also turns trigger TY Off and turns trigger TX On. Let us then assume that trigger TC and trigger TX are On. This provides an up level output from gate CX to the CX program step exit. This is coupled to the CY entry and this conditions OR gate CO and OR gate YO. The output of OR gate CO conditions gate 22 and the output from OR gate YO conditions gate 12. Now along comes the next program advance pulse. Because trigger TC is On, it couples an up level output to the gate 23. The program advance pulse then unblocks gate 23 and turns trigger TC Off. However, gate 22 is also conditioned and therefore this same pulse after a delay induced by delay unit 24 turns the trigger TC back On again. On the other hand, we had trigger TX On and therefore conditioning gate 20. The advance pulse unblocks gate 20 to turn trigger TX Off. Since the On input channel is blocked due to the output from OR gate XO, trigger TX remains Off. However, the output from OR gate YO conditions gate 12 and the advance pulse after a delay induced by delay unit 13 will turn trigger TY On. Now we have triggers TC and TY On and therefore the associated gate in the matrix, namely, CY provides an output.

It can be seen from the above that by proper external wiring between the exits and entries a variety of sequential operations can be obtained. However, if nonsequential operation is desired including either a forward skip or a backward skip, such can be achieved by the external wiring.

The various units which are shown diagrammatically here may be conventional units. For instance, any of the coincident gates AX, AY, etc., can be conventional diode AND gates. Also, these units may be coincident current cores. The triggers may be conventional triggers such as the Eccles-Jordan trigger as mentioned previously, or any other two-state device providing the necessary inputs and outputs. The gates associated with the On and Off inputs to the triggers can also be conventional, either diode, core or any other convenient type. The OR gates and the delay units are conventional. The delay units introduce only sufficient delay to store the program advance pulse allowing all triggers to be turned Off at program advance time prior to turning On the two triggers selected by the external wiring connections in conjunction with the coincident gates in the matrix. Additionally, the delay units allow the On inputs of the triggers to be gated for sequential program steps. The amount of delay is certainly less than the period between program pulses—less than one unit delay. The inverters are conventional inverters. Additionally, all of the circuitry employed here could be transistorized circuitry.

What has been disclosed is one embodiment of the present invention. Other embodiments obvious to those skilled in the art from the teachings herein are contemplated to be within the spirit and scope of the following claim.

What is claimed is:

A program step matrix driver, comprising:

a coordinate array of AND gates grouped in rows and columns and each having a row input terminal, a column input terminal, and an exit terminal, a plurality of bistable storage elements, namely, a row bistable storage element for each row of AND gates and a column bistable storage element for each column of AND gates, each bistable storage element having On and Off input terminals and On output terminal means;

means connecting the On output terminal means of each row bistable storage element to all of the AND gate row input terminals of its related row, and means connecting each On output terminal means of each column bistable storage element to all of the AND gate column input terminals of its related column, each of said AND gates being turned On when both of its input terminals are receiving signals from the On output terminal means of the related bistable storage elements and to then issue a half-signal signal;

a set of entry terminals, namely, one pertaining to each of said AND gates;

coupling means coupling each of said entry terminals to the On input terminals of a related pair of said bistable storage elements, namely, the row bistable storage element and the column bistable storage element, whose On output terminal means are connected to the input terminals of the AND gate pertaining to the respective entry terminal;

Pluggable connecting means for selectively connecting the output terminals of said AND gates individually to any desired ones of said entry terminals, whereby a half-select signal from the output terminal of any AND gate is transmitted through a related pluggable connecting means to a selected one of said entry terminals, to half-select the pair of coupling means connected to the selected entry terminal;

means including pulsing means adapted to pulse all of said coupling means concurrently to render any half-selected coupling means effective to turn on the bistable storage element connected thereto;

restoring means for turning off any of said bistable storage elements which is on, comprising an AND circuit having a first input terminal connected to the On output terminal means of the same bistable storage element, a second input terminal connected to said pulsing means, and an output terminal connected to the Off input terminal of the related bistable storage element;

each of said coupling means having delay means interposed before the On input terminal means of the related bistable storage element whereby pulses from said coupling means to turn on selected ones of said bistable storage elements are delayed to occur after the pulses to restore the bistable storage elements.

References Cited in the file of this patent

UNITED STATES PATENTS 2,969,533 Shanahan ............ Jan. 24, 1961

FOREIGN PATENTS 1,141,001 France ............ Mar. 16, 1959